United States Patent
Fuchs et al.

(10) Patent No.: US 12,475,090 B2
(45) Date of Patent: Nov. 18, 2025

(54) PRACTICAL FACT CHECKING SYSTEM FOR LLMs

(71) Applicant: eBay Inc., San Jose, CA (US)

(72) Inventors: Gilad Eliyahu Fuchs, Kfar-Saba (IL); Ben-Shaul Ido, Tel Aviv (IL)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 18/611,980

(22) Filed: Mar. 21, 2024

(65) Prior Publication Data

US 2025/0298780 A1 Sep. 25, 2025

(51) Int. Cl.
*G06F 16/215* (2019.01)
*G06F 16/248* (2019.01)
*G06F 16/25* (2019.01)

(52) U.S. Cl.
CPC .......... *G06F 16/215* (2019.01); *G06F 16/248* (2019.01); *G06F 16/258* (2019.01)

(58) Field of Classification Search
None
See application file for complete search history.

(56) References Cited

U.S. PATENT DOCUMENTS

| | | | | |
|---|---|---|---|---|
| 7,461,077 B1 * | 12/2008 | Greenwood | ........ | G06F 16/2428 |
| | | | | 707/999.102 |
| 11,615,144 B2 * | 3/2023 | Hammontree | ........ | G06F 16/353 |
| | | | | 706/12 |
| 12,141,541 B1 * | 11/2024 | Mishra | ................ | G06V 20/46 |
| 12,204,524 B1 * | 1/2025 | Birru | ................ | G06F 16/90335 |
| 12,235,872 B2 * | 2/2025 | Katsipoulakis | ......... | G06F 9/466 |
| 12,321,339 B1 * | 6/2025 | Dzhus | ................ | G06F 16/242 |
| 12,339,851 B2 * | 6/2025 | Sun | ....................... | G06F 16/248 |
| 12,353,407 B1 * | 7/2025 | Shachaf | ................ | G06F 16/243 |
| 12,386,837 B2 * | 8/2025 | Sharma | ................ | G06F 16/289 |
| 2023/0205785 A1 * | 6/2023 | Katsipoulakis | ......... | G06F 9/466 |
| | | | | 707/613 |
| 2024/0144347 A1 * | 5/2024 | Basin | ..................... | G06N 20/10 |
| 2024/0169408 A1 * | 5/2024 | Fuchs | ................ | G06Q 30/0627 |

(Continued)

FOREIGN PATENT DOCUMENTS

CN 119669548 3/2025

OTHER PUBLICATIONS

Extracting Prompt by Inverting LLM Outputs (Year: 2024).*

(Continued)

*Primary Examiner* — Kim T Nguyen
(74) *Attorney, Agent, or Firm* — SCHWEGMAN LUNDBERG & WOESSNER, P.A.

(57) ABSTRACT

A system for creating generated descriptive text is provided. A prompt having first facts for an item is received and parsed to extract a first fact in a format. Second facts are generated where the first fact and the second facts are output in the format. A search query is generated that includes the first fact and the second facts and then a search is conducted using the search query. An output is generated based on the results. The output includes a suggested description of the item using at least one first fact of the first facts and the second facts. The output also has a summarization of the plurality of first facts and the second facts along with differences between the first facts and the second facts. A distribution of the plurality of first facts and the second facts in the results is provided in the output.

20 Claims, 7 Drawing Sheets

(56) References Cited

U.S. PATENT DOCUMENTS

| | | | | |
|---|---|---|---|---|
| 2024/0289395 | A1* | 8/2024 | Zhou | G06F 16/9532 |
| 2024/0303247 | A1* | 9/2024 | Sokolov | G06N 20/00 |
| 2024/0372876 | A1* | 11/2024 | Shachar | H04L 41/16 |
| 2024/0394479 | A1* | 11/2024 | Pathak | G06F 40/295 |
| 2024/0403299 | A1* | 12/2024 | Sharma | G06F 16/2264 |
| 2025/0005523 | A1* | 1/2025 | Katta | G06F 40/186 |
| 2025/0005528 | A1* | 1/2025 | Mansour | G06Q 10/063114 |
| 2025/0007870 | A1* | 1/2025 | Kim | G06F 16/954 |
| 2025/0037222 | A1* | 1/2025 | Oluleye | G06Q 50/18 |
| 2025/0085131 | A1* | 3/2025 | Dasher | G06T 7/60 |
| 2025/0094139 | A1* | 3/2025 | Yu | G06F 8/10 |
| 2025/0131167 | A1* | 4/2025 | Fitzmaurice | G06F 30/27 |
| 2025/0138842 | A1* | 5/2025 | Lu | G06N 3/04 |
| 2025/0139552 | A1* | 5/2025 | Schürmann | G06F 30/20 |
| 2025/0139580 | A1* | 5/2025 | Lu | G06F 16/955 |
| 2025/0150474 | A1* | 5/2025 | Jones | H04L 63/1416 |
| 2025/0173339 | A1* | 5/2025 | Sun | G06F 16/248 |
| 2025/0173343 | A1* | 5/2025 | Perinchery | G06F 16/783 |
| 2025/0191048 | A1* | 6/2025 | Fuchs | G06Q 30/0631 |
| 2025/0225114 | A1* | 7/2025 | Sehgal | G06F 16/215 |
| 2025/0225127 | A1* | 7/2025 | Shachaf | G06F 16/2455 |
| 2025/0252121 | A1* | 8/2025 | Sulser | G06F 16/3329 |
| 2025/0252661 | A1* | 8/2025 | Wannerberg | G06T 17/00 |
| 2025/0267315 | A1* | 8/2025 | Maalej | H04N 21/812 |

OTHER PUBLICATIONS

A Prompt Engineering Approach for Structured Data Extraction from Unstructured Text Using Conversational LLMs (Year: 2024).*

One-Shot Prompt-based Approach for SPARQL Query Generation (Year: 2023).*

"Practical System to Monitor Large Language Models Hallucinations", Clarivate, (Dec. 20, 2023), 24 pgs.

Anonymous, "EcomGPT Instruction Tuning Large Language Models with Chain of Task Tasks for E commerce", arXiv:2308.06966v2, (Aug. 28, 2023), 13 pgs.

Cao, Meng, "Hallucinated but Factual Inspecting the Factuality of Hallucinations in Abstractive Summarization", arXiv:2109.09784v2, (Dec. 6, 2021), 14 pgs.

Chern, I Chun, "FacTool Factuality Detection in Generative AI A Tool Augmented Framework for Multi Task and Multi Domain Scenarios", arXiv:2307.13528v2, (Jul. 26, 2023), 25 pgs.

Dhuliawala, Shehzaad, "Chain of Verification Reduces Hallucination In Large Language Models", arXiv:2309.11495v2, (Sep. 25, 2023), 19 pgs.

Gao, Zhibin, "Critic Large Language Models Can Self Correct With Tool Interactive Critiquing", arXiv:2305.11738v2, (Sep. 30, 2023), 73 pgs.

Semmani, Sina J, "WikiChat Stopping the Hallucination of Large Language Model Chatbots by Few Shot Grounding on Wikipedia", WizarXiv 2305.14292v2, (Oct. 27, 2023), 27 pgs.

Shuster, Kurt, "Retrieval Augmentation Reduces Hallucination in Conversation", inarXiv 2104.07567v1, (Apr. 15, 2021), 21 pgs.

Wang, Cunxiang, "Survey on Factuality in Large Language Models Knowledge Retrieval and Domain Specificity", arXiv:2310.07521v2, (Oct. 18, 2023), 44 pgs.

"European Application Serial No. 24193549.3, Extended European Search Report mailed Jan. 29, 2025", 8 pgs.

Georgios, Peikos, "Utilizing ChatGPT to Enhance Clinical Trial Enrollment", Arxiv.org, Cornell University Library, 201 Olin Library Cornell University Ithaca, NY 14853, (Jun. 3, 2023), 39 pgs.

* cited by examiner

| Prompt | Generated Descriptive Text | Generated Facts | | | Sources | Distribution | | Missing Facts |
|---|---|---|---|---|---|---|---|---|
| Create Generated Descriptive Text About the Headphones Greatsound 500, the Attributes: Headphones: Model 500, Color: Black, Battery Life: Sixteen Hours | The Headphones Greatsound 500 Come in the Color Black and Have Great Dynamic Range and a Superior Battery Life of Eight Hours | Model | 500 | | 1. Greatsound.com<br>2. Bestsound.com<br>3. Soundsource.com<br>4. PKJ.com<br>5. MCJ.com<br>6. JCJ.com | Battery Life | 8 Hours<br>16 Hours<br>2 Hours | The Headphones Weige Twenty-Four Ounces |
| | | Color | Black | | | | | |
| | | Battery Life | 8 Hours | | | | | |

Prompt Facts:

| Model | 500 |
|---|---|
| Color | Black |
| Battery Life | 16 Hours |

FIG. 3

| Prompt | Generated Text | Generated Facts | | Prompt Facts | | Sources | Distribution | Missing Facts |
|---|---|---|---|---|---|---|---|---|
| Create Generated Descriptive Text About a Porsche™ 911™ GT3™, the Attributes: Color:Red, Horsepower: 502hp | This Porsche™ 911™ GT3™ is a Beautiful Shade of Red and has a Powerful 572hp Engine | Model GT3<br>Color Red<br>HP 572<br>618 618 | | Model 500<br>Color Black<br>HP 502hp | | 1. PKJPorsche.com<br>2. MCJPorsche.com<br>3. CaryPorsche<br>4. AJJPorsche.com<br>5. TZJPorsche.com<br>6. SLWPorsche.com | 502hp 572hp 409hp<br>HP | The Porsche™ 911™ GT3™ only Comes in Rear-Wheel Drive |

FIG. 6

PRACTICAL FACT CHECKING SYSTEM FOR LLMs

CLAIM OF PRIORITY

This application claims the benefit of priority of U.S. Provisional Application Ser. No. 63/539,772, filed Sep. 21, 2023, which is hereby incorporated by reference in its entirety.

TECHNICAL FIELD

Examples of the present disclosure relate generally to systems for generating text and, more particularly, but not by way of limitation, to systems for generating text based on a prompt received at the system.

BACKGROUND

When an item is listed on a website, additional information related to the item can be helpful to a user trying to determine if they should obtain the item. If the item is a watch, the additional information can relate to a green bezel and a product history of the item, such as changes that have been made to the watch over the years. The additional information can also include a history of those who have owned the item, including celebrities or the appearance of the item in the entertainment industry, such as in movies or shows.

Large language models (LLMs) can be used to find the additional information. For example, LLMs can search the internet and provide the additional information to an entity responsible for creating the listing. However, on occasion, LLMs can provide particular information that may appear to be real but in fact is a hallucination. In the watch example, a LLM may return information indicating that the watch also has a blue bezel, is waterproof, or was worn by a specific entertainer. The information by the LLM may seem to be authentic since a watch could be waterproof, or by virtue of the watch being expensive, could have been worn by the entertainer. However, the particular information is false. Regardless, by virtue of the particular information seeming to be real, the entity responsible for creating the listing may post the particular information with the listing for the watch and a user could rely on this false information in electing to obtain the item.

As an additional problem, when the additional information relating to the item is provided to an entity listing the item, which may or may not be true, may not be readily available or known by the entity listing the item. Thus, an entity will not be able to readily determine the truthfulness of the additional information.

BRIEF DESCRIPTION OF THE DRAWINGS

Various ones of the appended drawings merely illustrate examples of the present disclosure and should not be considered as limiting its scope.

FIG. 3 shows a user interface that can be generated to display prompt facts and generated facts, where the user interface can display any differences between the prompt facts and the generated facts along with a distribution of the differences, according to some examples.

FIG. 6 is a user interface that can be generated to display prompt facts and generated facts, where the user interface can display any differences between the prompt facts and the generated facts along with a distribution of the differences, according to some examples.

DETAILED DESCRIPTION

Figure 1:
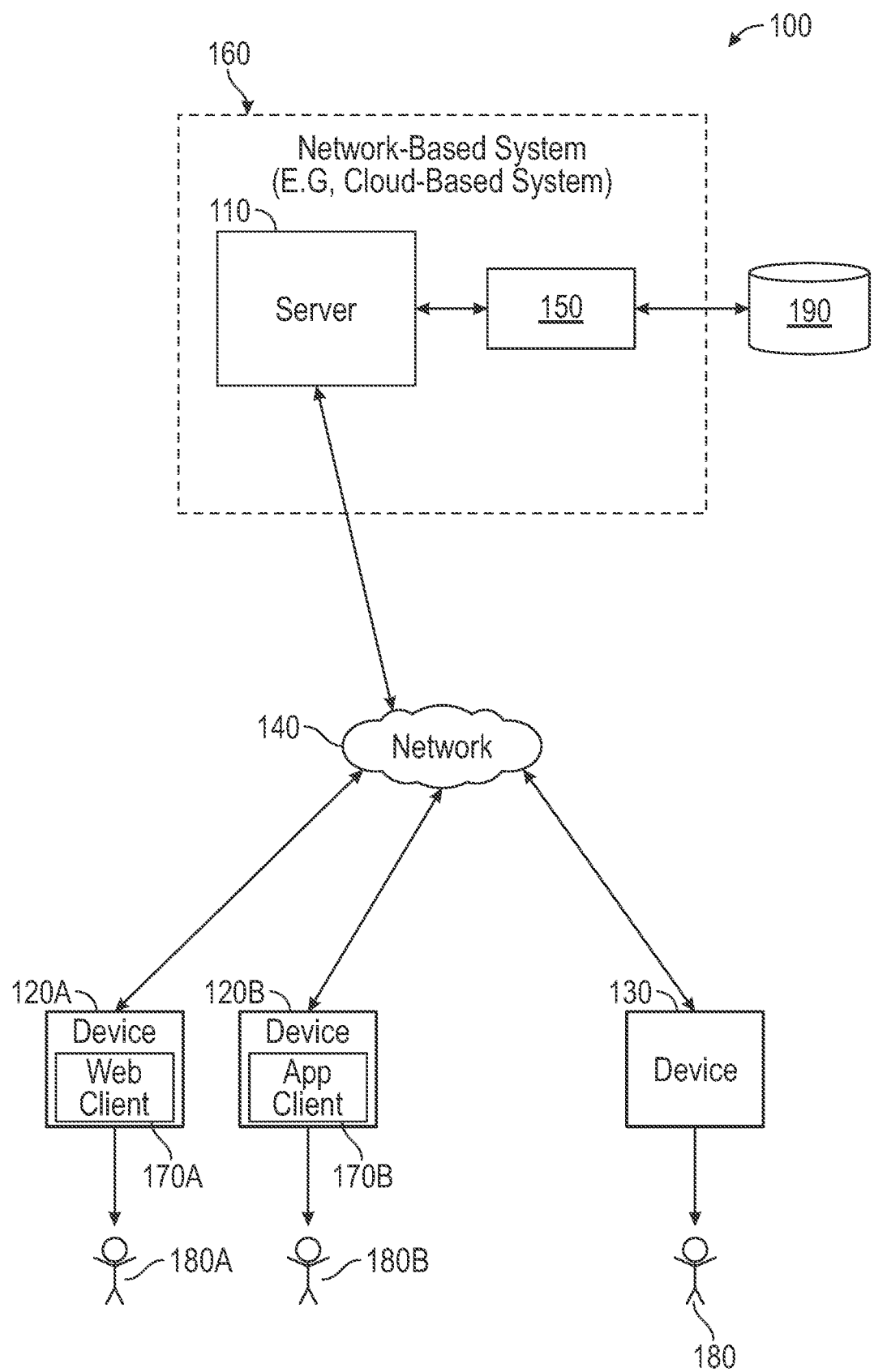
FIG. 1 is a network diagram illustrating a network environment suitable for generating descriptive text, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Examples relate to a system and method for generating descriptive text based on a prompt received as input text. The prompt can request that the system provide the generated descriptive text. The prompt can include a plurality of first facts and the generated descriptive text can include second facts based on the plurality of first facts. The system can have a LLM that can be used to create the generated descriptive text based on the input text in the prompt. The system can also provide an output that includes a comparison between the plurality of first facts and the second facts. The output can highlight any differences between the plurality of first facts and the second facts. The output can also list sources for the second facts along with a distribution of how often the second facts appear at individual sources of the list of sources.

As an illustration, a user may desire to create generated descriptive text for a green Rolex™ watch. Thus, the user provides a prompt that includes "Write generated descriptive text for a Rolex™ Submariner™ having a green bezel and a green dial with a stainless-steel bracelet" as input text. The system, using a LLM, can output generated descriptive text that states "The Rolex™ GMT-Master II™ can have a stainless steel bracelet with a black and green bezel and black dial" on a user interface.

The LLM can parse facts from the prompt and display the facts parsed from the prompt as prompt facts on the user interface. Likewise, the LLM can parse facts from the generated descriptive text and display the facts parsed from the generated descriptive text as generated facts. For the Rolex™ watch, the prompt facts can include a green bezel, a green dial, a stainless-steel bracelet, and the description of the watch being a Rolex™ Submariner™. The generated facts can include a black and green bezel, a black dial, and a stainless-steel bracelet, and the description of the watch being a Rolex™ GMT-Master II.

The user interface can also highlight differences between the prompt facts and the generated facts. Thus, the different facts relating to the bezels, i.e., the green bezel vs. the black and green bezel, the green dial vs. the black dial, and the names Submariner™ and GMT-Master II™ can be highlighted on the user interface. The sources, such as webpages, that were accessed to retrieve the generated facts and create the generated descriptive text can be listed. Moreover, for the differences between the prompt facts and the generated facts, a distribution of facts associated with the different facts can be displayed. Based on the user interface, the user can decide if the facts, such as the dial and bezel, should be deleted from the generated descriptive text, further investigated to determine which fact of the different facts is correct, i.e., the black dial is correct and the green dial is incorrect, or included as descriptive text for the Rolex™ watch. Based on the further investigation, a decision can be made regarding keeping the facts in the generated descriptive text or deleting the facts from the generated descriptive text.

Now turning attention to the Figures, a network diagram illustrating a network environment 100 suitable for generating descriptive text that a user has the option of using is shown in FIG. 1. The network environment 100 includes a server 110, along with devices 120A, 120B, and 130 communicatively coupled to each other via a network 140. The devices 120A and 120B can be collectively referred to as "devices 120," or generically referred to as "a device 120." The server 110 can include a machine learning model 150, such as a LLM, and can be part of a network-based system 160.

The devices 120 can interact with the 110 using a web client 170A or an app client 170B. The server 110, the devices 120, and the device 130 may each be implemented in a computer system, in whole or in part, as described below with respect to FIGS. 7 and 8.

The server 110, which can be an e-commerce server, can include an electronic commerce application to other machines (e.g., the devices 120A, 120B, and 130) via the network 140. The electronic commerce application can provide a way for users to buy and sell items directly to each other, to buy from and sell to the electronic commerce application provider, or both.

The network 140 may be any network that enables communication between or among machines, databases, and devices (e.g., the e-commerce server 110 and the devices 120 and 130). Accordingly, the network 140 may be a wired network, a wireless network (e.g., a mobile or cellular network), or any suitable combination thereof. The network 140 may include one or more portions that constitute a private network, a public network (e.g., the Internet), or any suitable combination thereof.

The machine learning model 150 can include any type of deep learning algorithm that can perform various natural language processing tasks, such as a large language model. Examples of a large language model can include Chat Generative Pre-trained Transformer (ChatGPT), Pathways Language Model (PaLM), Large Language Model Meta AI (LLaMA), BigScience Large Open-science Open-access Multilingual Language Model (BLOOM), or the like.

The machine learning model 150 can use deep learning to output text, such as generated descriptive text, through transformer neural networks. The machine learning model 150 can be provided ground rules, which as will be discussed further below, can include a format within which facts can be extracted from prompts and used to create generated descriptive text. In an unsupervised format, the machine learning model 150 can train to create generated descriptive text. The training can be used to create a deep learning neural network that uses a transformation architecture. Generated descriptive text created by the transformation architecture can be based on training data provided to the machine learning model 150.

Also shown in FIG. 1 are users 180A, 180B, and 180 associated with the devices 120A, 120B, and 130. Throughout this document, reference may be made to the user 180 and the users 180. It should be noted that the term user 180 and the term users 180 are interchangeable with each other. The user 180 may be a human user (e.g., a human being), a machine user (e.g., a computer configured by a software program to interact with the devices 120/130 and the server 110), or any suitable combination thereof (e.g., a human assisted by a machine or a machine supervised by a human). The user 180 is not part of the network environment 100, but is associated with the devices 120 and may be a user of the devices 120 (e.g., an owner of the devices 120A and 120B). For example, the device 120 may be a sensor, a desktop computer, a vehicle computer, a tablet computer, a navigational device, a portable media device, or a smart phone belonging to the user 180. The device 130 may be associated with a different user. Moreover, the user 180 can be a buyer or a seller, where each of the buyer and the seller can be associated with any of the devices 120 and 130. Furthermore, the user 180 may be associated with a user account accessible by the electronic commerce application provided by the server 110 via which the users 180 interact with the server 110.

Training a LLM to Identify Facts From a Text Input

As noted above, examples relate to a system and method for generating descriptive text based on a prompt received as input text. Prior to using the system to generate descriptive text based on a prompt, the system, and specifically a LLM such as a Generative Pre-trained Transformer (GPT), can be trained to identify factual statements and create generated descriptive text. The LLM can parse the prompt and extract first facts from the identified factual statements. Examples of text extraction can include head-driven phrase structure grammar, Penn Treebank, and the like. Sets of prompt text and generated text can be represented in a given format, such as a $key_n$:$value_n$ format, where the $key_n$ can be a subject and the $value_n$ can be descriptor of the subject. Using prompt text, the LLM can be trained to identify facts.

Prompt engineering can be used to train the LLM to produce specific responses and obtain answers according to a prompt provided during training. The provided prompts can convey meaning and context that can enable the LLM to create relevant and reliable generated descriptive texts. Shot prompting can be used with transformer-based models, such as GPT-4 incorporated by LLMs, to guide the LLM's output using a given number of examples or prompts, which can be referred to as shots. Zero, one, or few shot prompting can be used while training the LLM. In one-shot prompting, one example can be given before completing the request. A specialized prompt during one-shot prompting that can be designed for fact extraction can be used as the example, such as:

"Identify the facts within the following text: [PROMPT/ GENERATED TEXT] and write them in the following format {$key_1$:$value_1$, $key_2$:$value_2$}."

Figure 2:
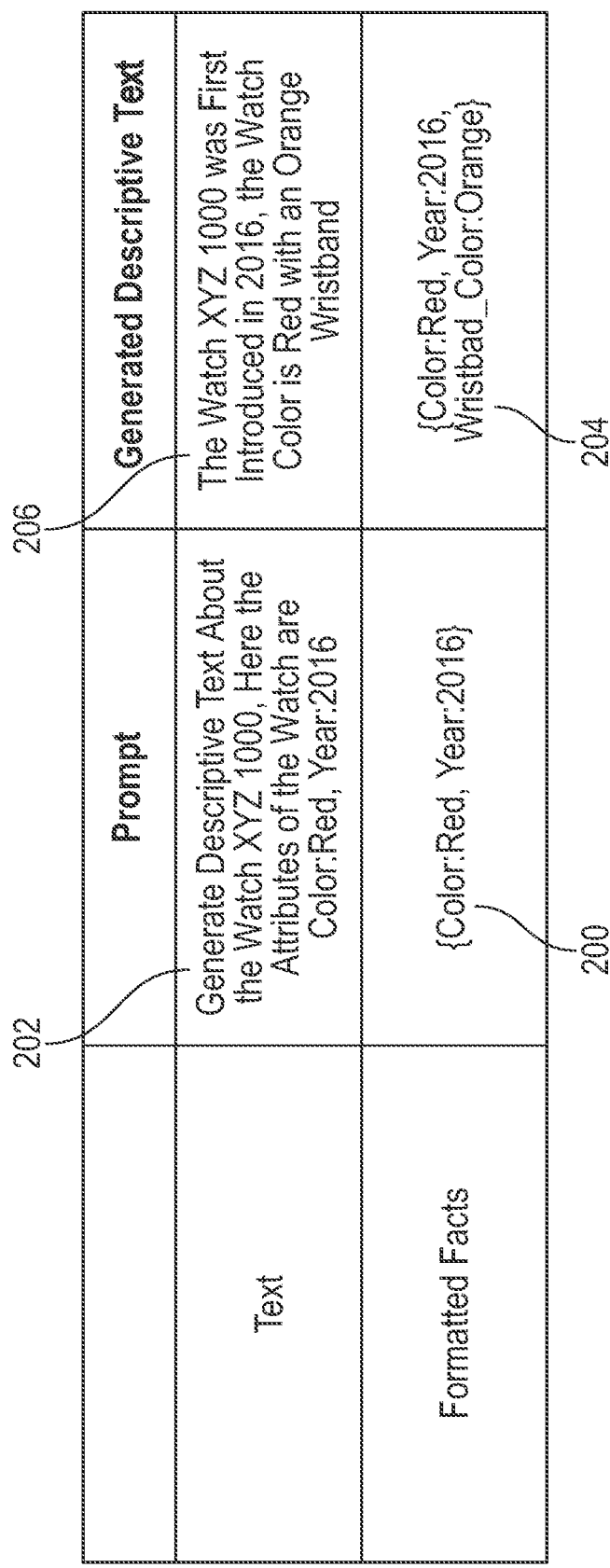
FIG. 2 illustrates an example of fact extraction from a prompt and fact extraction from generated descriptive text, according to some examples.

Thus, the LLM can be trained to create generated descriptive text. Moreover, the LLM can be trained to identify and extract $key_n$:$value_n$ pairs from a plurality of first facts. An example is shown with reference to FIG. 2, which illustrates an example of fact extraction from a prompt and fact extraction from generated descriptive text created by a LLM.

Formatted facts 200 can be pulled from prompt text 202. The formatted facts 200 in the prompt 202 can be {color: red, year:2016}. The prompt text 202 can be "Generate descriptive text about the watch XYZ 1000, here are the attributes of the watch—color:red, year: 2016." Formatted facts 204, which can be second facts, can be generated from generated descriptive text 206 by the LLM where the LLM can be trained to create the generated descriptive text 206 using the $key_n$:$value_n$ format. A comparison between the formatted facts 200 and 204 along with a comparison between the prompt text 202 and the generated descriptive text 206 can be performed to determine an accuracy of generated descriptive text output by the LLM. If errors occur, the output can be iteratively refined over time in order to refine the generated descriptive text 206 output by the LLM. While one-shot prompting is discussed though out, zero-shot prompting, few-shot prompting, Chain of Thought prompting, or any other type of prompt engineering can also be used in accordance with the principles of this disclosure.

Furthermore, if a user decides that the LLM is not returning the proper facts, the user can iteratively, or singularly, create new prompts over time to further refine the LLM. The user can also indicate to the LLM what facts should have been found and the LLM can use these additional datapoints, i.e., what facts should have been found, to further refine the LLM. For example, the user can provide the following to the LLM:

"Given the prompt [ORIGINAL PROMPT] the text generated was [ORIGINAL GENERATED TEXT]. The following information described in the generated text is incorrect-[IDENTIFIED WRONG FACTS] and should be [UPDATED FACTS] respectively. Generate the text again this time replacing the wrong information with the new provided information."

In examples, the LLM can be trained over time to improve the accuracy with which the LLM can identify facts from text input. For example, different patterns in the input text can arise over time that are more probative of first facts that should be used to generate second facts to create generated descriptive text. These different patterns in the input text can be used to train the LLM to determine the tendencies and preferences of a user providing the input text that change over time. The tendencies and preferences can relate to the tendencies and preferences for the generated descriptive text of the user providing the input text, such as a prompt. These different tendencies and preferences can be used to train the LLM to change the generated descriptive text provided by the LLM.

Thus, at time $t_1$, the user may have a first preference and first tendency for a first type of generated descriptive text. However, at time $t_2$, the first preference and the first tendency may change based on feedback received for the first generated descriptive text to a second preference and a second tendency. The second preference and the second tendency may result in second generated descriptive text that is preferred by the user. Thus, the LLM can be continually trained over time, such as between the time $t_1$ and the time $t_2$, to reflect the changing preferences and the changing tendencies of users. Moreover, the tendencies and preferences for a user can change over time based on the success of selling items that use the generated descriptive text.

Moreover, the facts that are included in the generated descriptive text to meet user needs can change over time. Thus, at the time $t_1$, a first type of fact may be required or preferred in the generated descriptive text. However, at the time $t_2$, a second type of fact may be required or preferred in the generated descriptive text. The LLM can be continually trained over time, and change over time, to account for these fact changes.

Fact Retrieval From External Sources

The LLM can generate a search query using first facts such as the formatted facts 200 and second facts such as the formatted facts 204. In order to conduct a search of external sources, the LLM can formulate a search query relevant to facts identified in the generated descriptive text. An output that can be used to generate the search query can have the following format: "### The following fact—[FACT] was extracted from the text—[GENERATED DESCRIPTIVE TEXT]." The search query can be used to perform a search of external sources, such as web sites or the like in order to corroborate facts in a prompt received from a user and generated descriptive text created by the LLM. Fact retrieval can be performed after creation of the generated descriptive text. Moreover, fact retrieval can be performed before the LLM creates the generated descriptive text in order to assist with the creation of the generated descriptive text.

The facts can correspond to data that can be used to search external sources. External sources can be scraped using search engines, such as the Bing™ Web Search API or the like, to fetch webpages that can have facts that can be used to corroborate the facts in the prompt and the generated descriptive text. The webpages can also have facts that are different from the facts in the prompt and the generated descriptive text. More specifically, the facts in the webpages can be the same as the $key_n$ but can have a different $value_n$ associated with the $key_n$. Thus, the $key_n$ for the fact in the web page can be the same subject but the $value_n$ can include a different descriptor associated with the $key_n$. In addition to scraping the web, search result snippets can be used to corroborate facts that are identified from a prompt. The snippets can also have facts that are different from the facts in the prompt and the generated descriptive text as described above. For those webpages or search result snippets that are found to have at least one of the facts, such as the $key_n$, they can be retrieved and the LLM can perform textual analysis to pinpoint any relevant facts using any type of technique.

To further illustrate, and referred to herein as "the headphone illustration," using the format above, the LLM can create the generated descriptive text 300 "the headphones GreatSound 500 come in the color black and have great dynamic range and a superior battery life of eight hours" from the prompt 302 "create generated descriptive text about the headphones GreatSound 500, the attributes: headphones: model 500, color: black, battery life: sixteen hours" that can be received from a user. Thus, the format output by the LLM could be, which incorporates the $key_n$:$value_n$ format for the [FACT], "headphones: model 500," "color: black" and "battery life: sixteen hours" where "the headphones GreatSound 500 have great dynamic range and a superior battery life of eight hours," can correspond to [GENERATED DESCRIPTIVE TEXT]. Based on this output, the LLM can create the following search query "GreatSound 500 color and battery life."

Using the search query "GreatSound 500 color and battery life," the LLM can search external sources. In the headphone illustration, the results received from the search query "GreatSound 500 color and battery life" could result in web pages that have the following statements, "GreatSound 500 have a matte black finish but the battery only lasts two hours," "the GreatSound 500 headphones have an average battery life of eight hours," "the GreatSound 500 look really nice in black but the battery life, which is eight hours, could be longer," "with a battery life of sixteen hours and a weight of only twenty-four ounces, the GreatSound 500 headphones are great for overnight air travel!," "nice headphones, especially with sixteen hours of battery life," and "cool looking headphones with a battery life of eight hours." In the illustration, the statements were pulled from the fictious websites Greatsound.com, BestSound.com, SoundSource.com, PKJ.com, MCJ.com, and JCJ.com. The LLM can perform text analysis and gather the following facts from the search results, the GreatSound 500 headphones have a black color, have a battery life of two hours, eight hours, and sixteen hours, and weigh twenty-four ounces. Here the $key_n$ of a battery life having a descriptor $value_n$ of two hours differs from the values, of sixteen hours in the prompt and eight hours in generated descriptive text associated with the of battery. Moreover, the $key_n$ of a weight of the headphones having a descriptor $value_n$ of twenty-four ounces is missing in both the prompt facts and the generated descriptive text facts.

Aggregation of Facts Retrieved from External Sources

Once the search results are received and textual analysis has been performed to gather facts, the gathered facts can be aggregated and compared to prompt facts 304 in the prompt 302 from the user and generated facts 306 in the generated descriptive text 300. The prompt facts 304, which can also be first facts, can be generated from the prompt 302 as discussed above. Similarly, the generated facts 306, which can also be second facts, can be generated from the generated descriptive text 300 as discussed above.

During aggregation, in the headphone illustration, the facts that the GreatSound 500 headphones have a black color, and have a battery life of two hours, eight hours, and sixteen hours can be compared with the prompt facts 304 and the generated facts 306. Regarding the facts of the GreatSound 500 headphones having a black color, during the comparison, the LLM can generate the $key_n$:$value_n$ pairs of "headphones: model 500," "color: black." The LLM can determine that the external sources include the same facts as the prompt and the generated descriptive text.

Regarding the facts of the headphones having a battery life of two hours, eight hours, and sixteen hours, during the comparison, the LLM can generate the $key_n$:$value_n$ pairs battery life: two hours, battery life: eight hours, and battery life: sixteen hours. The LLM can then compare these $key_n$:$value_n$ pairs against the $key_n$:$value_n$ pairs of battery life: eight hours in the generated facts 306 and battery life: sixteen hours in the prompt facts 304. During aggregation, the LLM determines that the $key_n$:$value_n$ pair of battery life: two hours appeared once in the external sources, the $key_n$:$value_n$ pair of battery life: eight hours appeared three times in the external sources, and the $key_n$:$value_n$ pair of battery life: sixteen hours appeared twice in the external sources.

In addition, the search of the external sources found the $key_n$ of a weight of the headphones having a descriptor value of twenty-four ounces, which is missing in both the prompt facts and the generated descriptive text facts.

Output of the Generated Descriptive Text

The LLM can also generate an output in the form of a user interface 308 that can correspond to a fact identification system based on the results from the search query. The user interface 308 can display the generated descriptive text 300, the prompt 302, the prompt facts 304, and the generated facts 306. The user interface can also highlight any differences between a generated fact 310 and a prompt fact 312. In particular, the facts 310 and 312 can each correspond to the same subject ($key_n$) and can have either the same descriptor ($value_n$) or a different descriptor ($value_n$).

When the generated fact 310 differs from the prompt fact 312, a background 314 of the generated fact 310 can be highlighted. Highlighting can include coloring the generated fact background 314, cross-hatching the generated fact background 314, highlighting the text of the generated fact 310, boldfacing the text of the generated fact 310, or using any other technique that can differentiate the generated fact 310 from the prompt fact 312. The difference can occur when the LLM pulls a descriptor ($value_n$) associated with the subject ($key_n$) for a fact from a source that is accessible to the LLM. The source can include a database where the different descriptor ($value_n$) was determined from a generated descriptive text previously created by the LLM for another prompt having the same subject ($key_n$). In the headphone illustration, the generated descriptive text included the fact that the headphone has a battery life of eight hours instead of sixteen hours in the prompt. This difference can be highlighted using the generated fact background 314.

The user interface 308 can also list the external sources 316 the LLM accessed during fact retrieval in order to create the generated descriptive text. Thus, the user interface 308 can show three different sources of facts, the user, as reflected by the prompt 302, the LLM generated facts, as reflected by the generated facts 306 such as pulling from the source that is accessible to the LLM as mentioned above, and external sources, such as the external sources 316. In the headphone illustration, the external sources Greatsound.com, BestSound.com, SoundSource.com, PKJ.com, MCJ.com, and JCJ.com were accessed.

As mentioned above, while accessing the external sources 316 using the $key_n$:$value_n$ pairs, descriptors ($value_n$) for the subjects ($key_n$) that are different from the descriptors ($value_n$) used in the prompt and the generated descriptive text may have been found. While accessing the external sources using the $key_n$:$value_n$ pairs, descriptors ($value_n$) for the subjects ($key_n$) that are different from the descriptors ($value_n$) used in the prompt but are the same as the descriptors ($value_n$) in the generated descriptive text may have been found. While accessing the external sources using the $key_n$:$value_n$ pairs, descriptors ($value_n$) for the subjects ($key_n$) that are different from the descriptors ($value_n$) used in the generated descriptive text but are the same as the descriptors ($value_n$) in the prompt may have also been found. In a distribution 318, a frequency of how often the different descriptors ($value_n$) were found in the external sources 316 can be illustrated.

In the headphones illustration, a battery life of two hours appeared once, a battery life of eight hours appeared three times, and a battery life of sixteen hours appeared twice in the external sources 316. In the distribution 318, individual descriptors 320-324 can be listed along with distributions 326-330 associated with each of the descriptors 320-324. The descriptors 320-324 can each correspond to a subject ($key_n$) having a descriptor ($value_n$) for facts that varies from either the prompt facts 304 or the generated facts 306. For the subject ($key_n$) battery life, the descriptor ($value_n$) varied among sixteen hours for the prompt facts 304 and eight hours for the generated facts 306 and two hours for facts from the external sources 316.

The distributions 326-330 can indicate a number of times each of the descriptors 320-324 were found in the external source 316. In the headphone illustration, the descriptor 320, which corresponds to a battery life of two hours, appeared once in the external sources 316. The distribution 326 can have a single indicator 326A. The descriptor 322, which corresponds to a battery life of sixteen hours, appeared twice in the external sources 316. The distribution 328 can have two indicators 328A. The descriptor 324, which corresponds to a battery life of eight hours, appeared three times in the external sources 316. The distribution 330 can have three indicators 330A. While the distributions 326-330 are shown as having the indicators 326A-330A corresponding to blocks, any type of indicator can be used, such as color coding where different colors can correspond to different amounts, a length of the distributions 326-330, where a longer length can correspond to greater instances, i.e., a distribution corresponding to three instances can be longer than a distribution corresponding to single instance, and the like.

In instances where the LLM pulls facts from the external sources 316 that are missing from the prompt facts 304 and the generated facts 306, the user interface 308 can also include a missing facts section 332. In the headphones illustration, a weight of the headphones was found while searching the external sources 316. A missing fact 334 that indicates the headphones weigh twenty-four ounces can be included in the missing facts section 332. Thus, a user can see that additional facts were found when the external sources 316 were searched that was not included in the prompt 302 or the generated descriptive text 300.

In examples, a user who provided the prompt 302 can decide if the generated descriptive text 300 should be used based on the output displayed in the user interface 308. The user interface 308 and the information displayed on the user interface 308 can provide many benefits. The user who provided the prompt 302 can decide if aspects in the generated descriptive text 300 should be ignored based on any differences, such as those highlighted by the generated fact background 314. In particular, a user can decide that the aspects in the generated descriptive text 300 that should be ignored are hallucinations. The user can decide if additional information should be provided in the generated descriptive text 300, such as adding a weight of the headphones. Moreover, the user can decide if further investigation should be performed for any of the facts based on the information displayed at the user interface 308 by searching additional external sources. In examples, the search can be conducted based on the differences.

In the headphones illustration, the user can decide that additional searching should be conducted on the weight of the headphones and a battery life of the headphones. Furthermore, the user can access the external sources 316 to gain further insight for facts that are different from the prompt facts 304, such as the differences in the battery life and the weight of the headphones.

Figure 4:
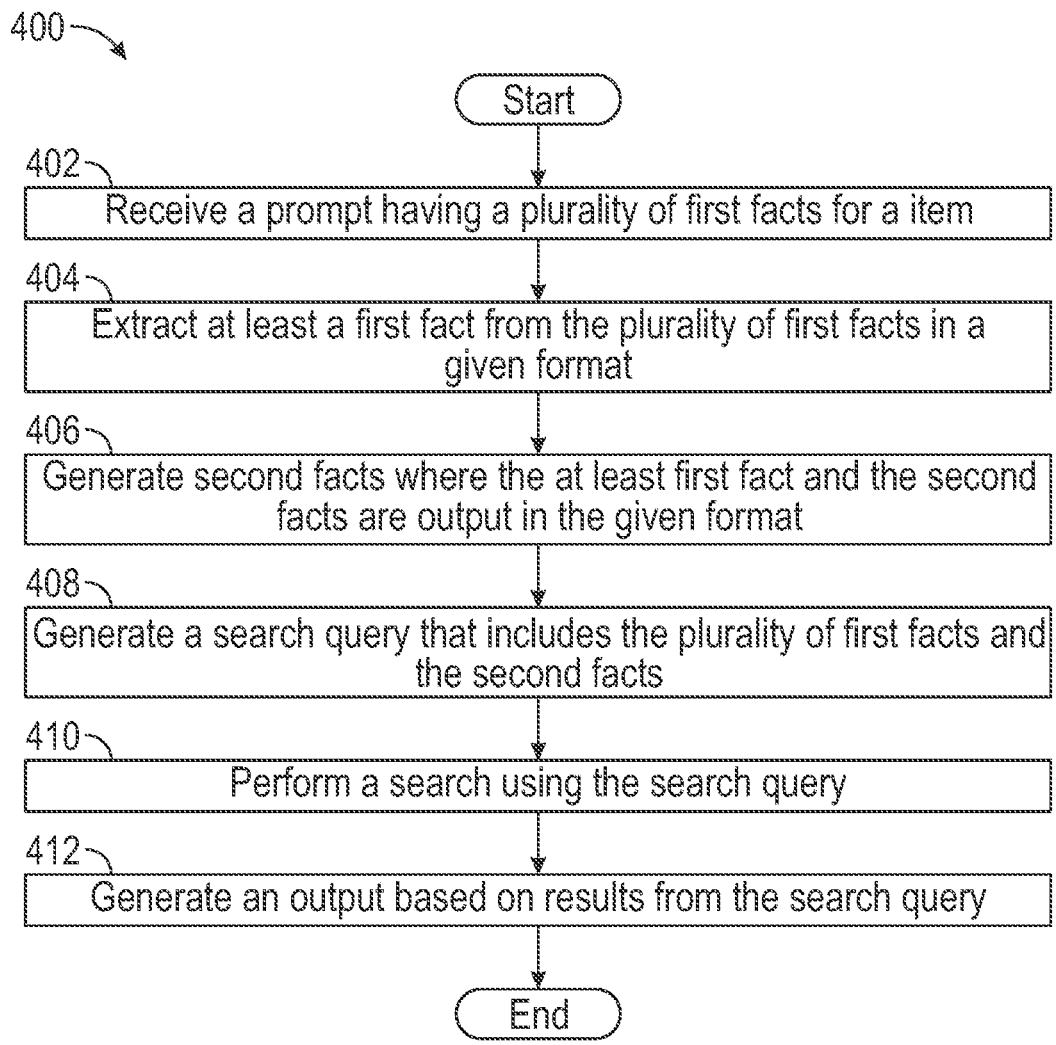
FIG. 4 shows a method that generates descriptive text based on a prompt received as input text, according to some examples.

Now making reference to FIG. 4, a method 400 that generates descriptive text based on a prompt received as input text is described. During an operation 402, a prompt having a plurality of first facts for an item can be received. A user may be interested in selling the item and the user may desire to have generated descriptive text created for the item. The generated descriptive text can relate to marketing materials that describe the item and can be used to assist with selling the item. In order to create the generated descriptive text, the user can provide data about the item, which can include a plurality of first facts. The data about the item can be received at a server. During an operation 404, a first fact can be extracted from the plurality of first facts as described above.

Figure 5:
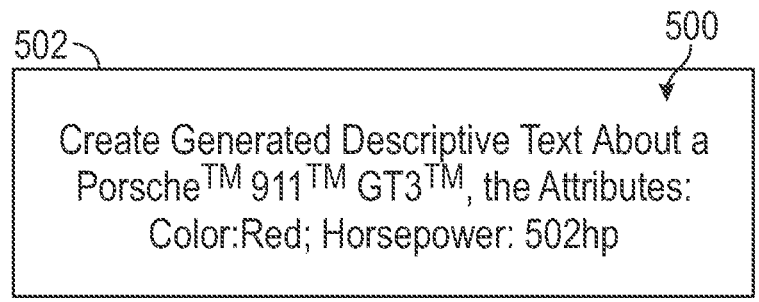
FIG. 5 illustrates a user interface that can be used to receive a prompt, according to some examples.

As an example of the method 400 and referred to herein as "the vehicle illustration," the user 180 may desire to have generated descriptive text created for a Porsche™ 911™ GT3™. During the operation 402, the user 180 can input a prompt 500 at a user interface 502, as shown in FIG. 5. In the illustration, the item relates to the Porsche™ 911™ GT3™ and the prompt 500 can be "Create generated descriptive text about a Porsche™ 911™ GT3™, the attributes: color: red, horsepower: 502 hp." The plurality of first facts can relate to the color of the Porsche™ 911™ GT3™ being red and having an output of 502 hp. The server 110 and the machine learning model 150 via the server 110 can receive the prompt 500 during the operation 402. In the vehicle illustration, the machine learning model 150 can be trained as described above with respect to FIGS. 2 and 3. Thus, the machine learning model 150 can extract, in the form of $key_n$:$value_n$ pairs, the first facts color:red and horsepower:502 hp during the operation 404 as described above.

Returning to FIG. 4, once at least a first fact is extracted from the plurality of first facts during the operation 404, the method 400 can perform an operation 406 where second facts are generated and the first facts and the second facts can be output in a given format using the techniques described above. In particular, the given format can be the $key_n$:$value_n$ pairs. Furthermore, the second facts are generated using the first facts as described above. A search query that includes the first facts and the second facts can be generated during the operation 408 also using the techniques described above. The method 400 can then perform a search using the generated search query during an operation 410.

In the vehicle illustration, during the operation 406, the machine learning model 150 can generate the following second facts based on the first facts, the model of the Porsche™ is a GT3™, the color is red, and the Porsche™ 911™ GT3™ generates 572 hp. In addition, the machine learning model 150 can create generated descriptive text 600 (FIG. 6) that states "This Porsche™ 911™ GT3™ is a beautiful shade of red and has a powerful 572 hp engine." In the illustration, the difference in horsepower, i.e., 502 hp vs. 572 hp, can occur when the machine learning model 150 pulls a descriptor ($value_n$) of 572 hp associated with the subject ($key_n$) of horsepower from a database 190 where the machine learning model 150 previously created generated descriptive text for a different Porsche™ 911™. During the operation 408, the machine learning model 150 generates the following search query "Porsche™ 911™ GT3™ color and horsepower" based on the generated descriptive text 600 using the methodologies described above. Furthermore, the machine learning model 150 conducts a search using the search query "Porsche™ 911™ GT3™ color and horsepower." In the vehicle illustration, a search of the following external sources is conducted: PKJPorsche.com, MCJPorsche.com, CaryPorsche.com, AJJPorsche.com, TZJPorsche.com, and SLWPorsche.com during the operation 410.

The method 400 also generates an output of the results from the search query during an operation 412. The output can be in the form of a user interface as detailed above with reference to FIG. 3 and the user interface 308. In particular, the output can list the prompt, the generated descriptive text, prompt and generated facts, external sources, any distributions of facts, and any missing facts. Returning to the vehicle illustration and making reference to FIG. 6, during the operation 412, the machine learning model 150 can generate a user interface 602 for display at the user device 130 associated with the user 180. The user interface 602 can include the prompt 500, the generated descriptive text 600, a generated facts section 604, and a prompt facts section 606. The user interface 602 can also list an external sources section 608, a distribution section 610, and a missing facts section 612. Each of the features of the user interface 602 can be generated as discussed above with reference to FIG. 3 and the user interface 308.

In the vehicle illustration, the generated descriptive text 600 indicated that the Porsche™ 911™ GT3™ has a powerful 572 hp engine. In the generated facts section 604, a generated fact 614 can list the horsepower as 572 hp. The generated fact 614 can differ from a prompt fact 616, which is 502 hp. Since the generated fact 614 differs from the prompt fact 616, the generated fact 614 can include a generated fact background 618, which can have the same characteristics as the generated fact background 314 in order to highlight to the user 180 that a factual difference occurs between the generated facts 604 and the prompt facts 606.

The user interface 602 can also list the external sources that were accessed and searched using the search query "Porsche™ 911™ GT3™ color and horsepower." The external sources PKJPorsche.com, MCJPorsche.com, CaryPorsche.com, AJJPorsche.com, TZJPorsche.com, and SLWPorsche.com were searched during the operation 410 in the vehicle illustration. Thus, these sources can be listed in the external sources section 608.

Since the generated descriptive text 600 indicates a different horsepower rating for the Porsche™ 911™ GT3™, the distribution section 610 can list descriptors 620-624 along with distributions 626-630 associated with each of the descriptors 620-624. The descriptors 620-624 can each correspond to a subject ($key_n$) having a descriptor ($value_n$) for facts that varies from the prompt facts 606 and the generated facts 604. For the subject ($key_n$) hp, the descriptor ($value_n$) varied among 502 hp for the prompt facts 606 and 572 hp for the generated facts 604 and 409 hp for facts found in the external sources 608.

Each of the distributions 626-630 can include indicators 626A-630A having characteristics similar to the indicators 326A-330A described above. The descriptor 624 was found in three of the external sources shown in the external sources section 608. Thus, the descriptor 624 can have three indicators 630A. Each of the descriptors 620 and 622 were found in one of the external sources shown in the external sources section 608. Accordingly, each of the descriptors 620 and 622 can have one indicator 626A and 628A respectively, as shown.

When the user 180 views facts, such as the generated fact 614 and a missing fact 632 in the missing facts section 612, the user 180 can decide if aspects in the generated descriptive text 600 should be ignored based on any differences such as those highlighted by the generated fact background 618. The user 180 can also decide if additional information should be provided in the generated descriptive text 600, such as adding that the Porsche™ 911™ GT3™ is only rear-wheel drive. Moreover, the user 180 can decide if further investigation should be performed for ones of the facts based on the information displayed at the user interface 602. In the illustration, the user 180 is interested in further investigating if a Porsche™ 911™ GT3™ is in fact only rear-wheel drive. Therefore, the user 180 can have the machine learning model 150 conduct a further search of external sources using the search query Porsche™ 911™ GT3™: rear wheel drive only, as described above. Moreover, the user 180 can ignore the generated fact relating to 572 hp in the generated descriptive text 600 and instead elect to use the 502 hp rating. In particular, the user 180 can determine that the generated fact 614 of 572 hp is a hallucination.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 7 and 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

Figure 7:
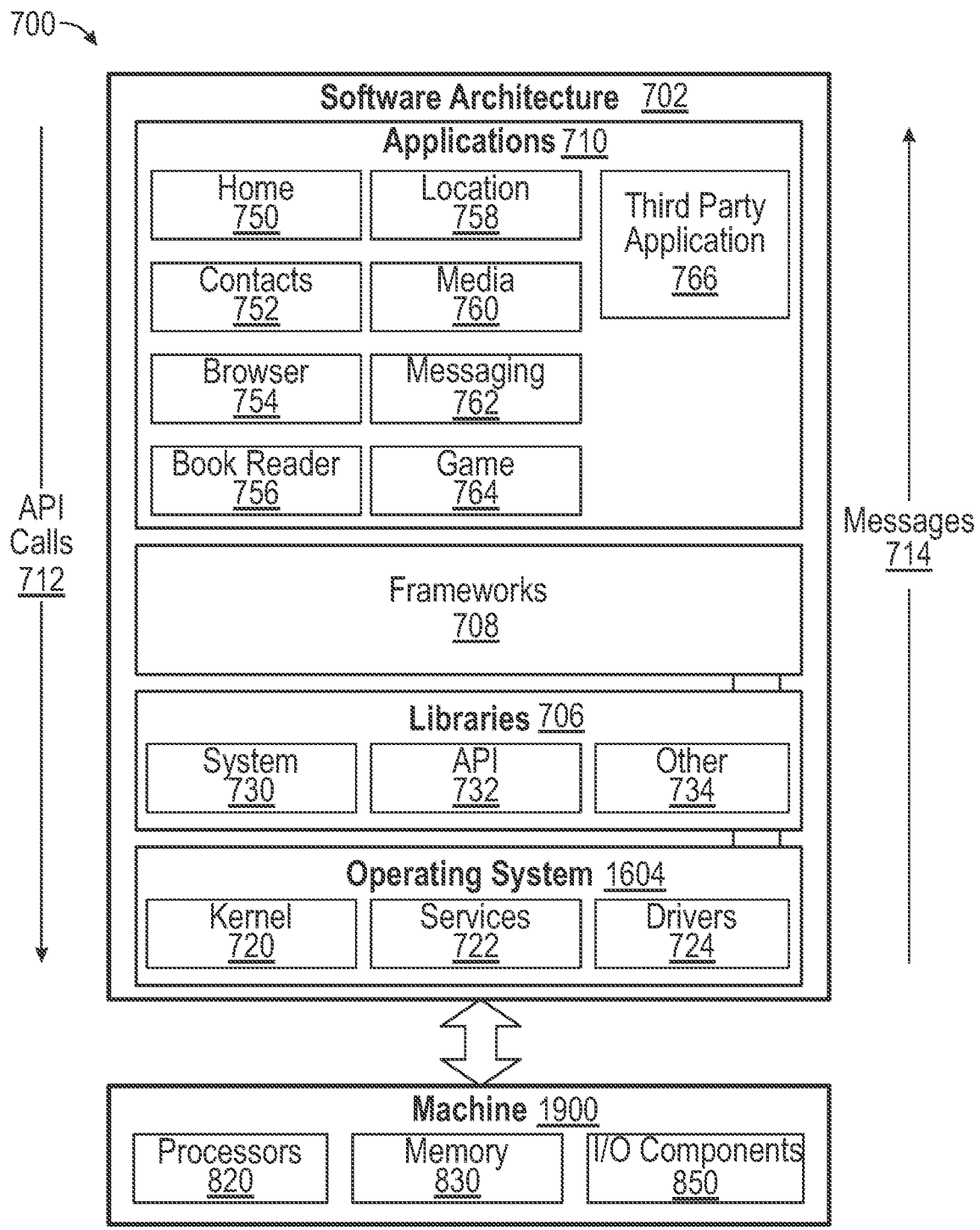
FIG. 7 is a block diagram illustrating architecture of software used to implement social network-initiated listings, according to some examples.
Figure 8:
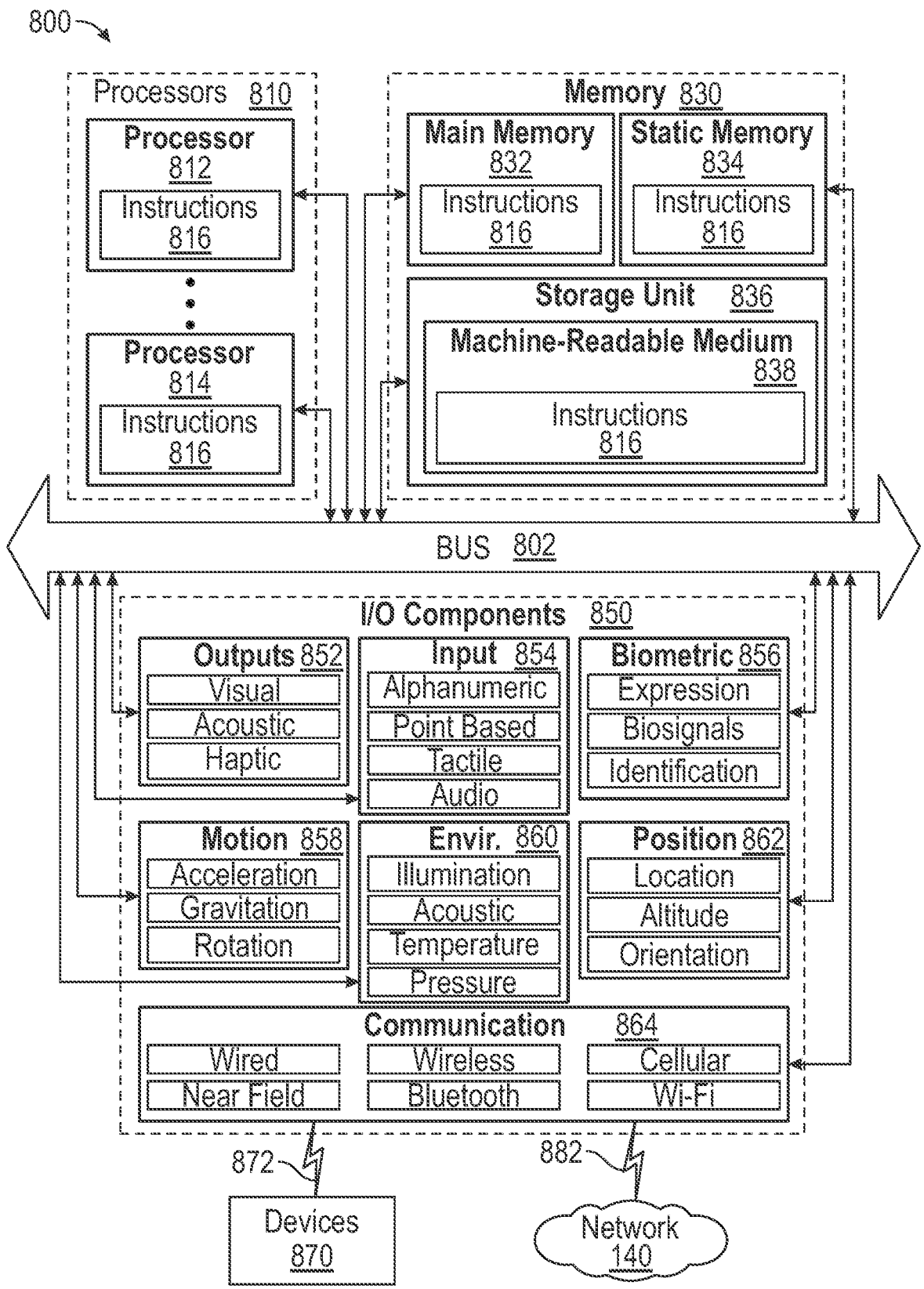
FIG. 8 shows a machine as an example computer system with instructions to cause the machine to implement social network-initiated listings, according to some examples.

FIG. 7 is a block diagram 700 illustrating a software architecture 702, which may be installed on any one or more of the devices described above. FIG. 18 is merely a non-limiting example of a software architecture, and it will be appreciated that many other architectures may be implemented to facilitate the functionality described herein. The software architecture 702 may be implemented by hardware such as a machine 700 of FIG. 8 that includes processors 810, memory 830, and I/O components 850. In this example, the software architecture 702 may be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 1812 through the software stack and receive messages 714 in response to the API calls 712, according to some implementations.

In various implementations, the operating system 704 manages hardware resources and provides common services. The operating system 704 includes, for example, a kernel 720, services 722, and drivers 724. The kernel 720 acts as an abstraction layer between the hardware and the other software layers in some implementations. For example, the kernel 720 provides memory management, processor management (e.g., scheduling), component management, networking, and security settings, among other functionality. The services 722 may provide other common services for the other software layers. The drivers 724 may be responsible for controlling or interfacing with the underlying hardware. For instance, the drivers 724 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 706 provide a low-level common infrastructure that may be utilized by the applications 710. The libraries 706 may include system libraries 730 (e.g., C standard library) that may provide functions such as memory allocation functions, string manipulation functions, mathematic functions, and the like. In addition, the libraries 706 may include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 may also include a wide variety of other libraries 734 to provide many other APIs to the applications 710.

The frameworks 708 provide a high-level common infrastructure that may be utilized by the applications 710, according to some implementations. For example, the frameworks 708 provide various graphic user interface (GUI) functions, high-level resource management, high-level location services, and so forth. The frameworks 708 may provide a broad spectrum of other APIs that may be utilized by the applications 710, some of which may be specific to a particular operating system or platform.

In an example, the applications 710 include a home application 750, a contacts application 752, a browser application 754, a book reader application 756, a location application 758, a media application 760, a messaging application 762, a game application 764, and a broad assortment of other applications such as a third-party application 766. According to some examples, the applications 710 are programs that execute functions defined in the programs. Various programming languages may be employed to create one or more of the applications 710, structured in a variety of manners, such as object-orientated programming languages (e.g., Objective-C, Java, or C++) or procedural programming languages (e.g., C or assembly language). In a specific example, the third-party application 766 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 766 may invoke the API calls 712 provided by the mobile operating system (e.g., the operating system 704) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 106 (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

FIG. 19 is a block diagram illustrating components of a machine 800, according to some examples, able to read instructions from a machine-readable medium (e.g., a machine-readable storage medium) and perform any one or more of the methodologies discussed herein. Specifically, FIG. 19 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. In alternative examples, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other via a bus 802. In an example, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (also referred to as "cores") that may execute instructions contemporaneously. Although FIG. 19 shows multiple processors, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836 accessible to the processors 810 via the bus 802. The storage unit 836 may include a machine-readable medium 838 on which are stored the instructions 816 embodying any one or more of the methodologies or functions described herein. The instructions 816 may also reside, completely or at least partially, within the main memory 832, within the static memory 834, within at least one of the processors 810 (e.g., within the processor's cache memory), or any suitable combination thereof, during execution thereof by the machine 800. Accordingly, in various implementations, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown in an example to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 may include many other components that are not shown in FIG. 9. The I/O components 850 are grouped according to functionality merely for simplifying the following discussion and the grouping is in no way limiting. In various examples, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further examples, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 140 or devices 870 via a coupling 882 and a coupling 872, respectively. For example, the communication components 864 include a network interface component or another suitable device to interface with the network 140. In further examples, the communication components 864 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, in some implementations, the communication components 864 detect identifiers or include components operable to detect identifiers. For example, the communication components 864 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 864, such as location via Internet Protocol (IP) geolocation, location via Wi-Fi® signal triangulation, location via detecting an NFC beacon signal that may indicate a particular location, and so forth.

In various examples, one or more portions of the network 140 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 140 or a portion of the network 140 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In examples, the instructions 816 are transmitted or received over the network 140 using a transmission medium via a network interface device (e.g., a network interface component included in the communication components 864) and utilizing any one of a number of well-known transfer protocols (e.g., Hypertext Transfer Protocol (HTTP)). Similarly, in other examples, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 as "non-transitory" should not be construed to mean that the medium is incapable of movement; the medium should be considered as being transportable from one physical location to another. Additionally, since the machine-readable medium 838 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific examples, various modifications and changes may be made to these examples without departing from the broader scope of examples of the present disclosure. Such examples of the inventive subject matter may be referred to herein, individually or collectively, by the term "invention" merely for convenience and without intending to voluntarily limit the scope of this application to any single disclosure or inventive concept if more than one is, in fact, disclosed.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. The specification and drawings are, accordingly, to be regarded in an illustrative rather than a restrictive sense.

What is claimed is:

1. A method, comprising:
    receiving a prompt with a request associated with an item;
    parsing, by a large language model (LLM), the prompt to extract a plurality of first facts for the item in a predefined format;
    generating, by the LLM, descriptive text based on the prompt;
    parsing, by the LLM, the descriptive text to extract a plurality of second facts for the item in the predefined format;
    generating a search query that includes the plurality of first facts and the second facts;
    performing a search using the search query;
    generating an output based on results from the search query, the output including:
        a suggested description of the item, the suggested description including at least one fact of the plurality of first facts and one fact of the plurality of second facts;
        a summarization of the plurality of first facts and the second facts;
        differences between the plurality of first facts and the second facts;
        an accuracy of the generated descriptive text output by the LLM; and
        a distribution of the plurality of first facts and the second facts in the results; and
    presenting the output on a user interface.

2. The method of claim 1, wherein the predefined format is a key value pair and the output includes the plurality of first facts and the plurality of second facts in the key value pair format.

3. The method of claim 1, wherein the output provides a listing of sources of the plurality of second facts.

4. The method of claim 1, further comprising:
presenting a distribution of a number of times the second facts are in sources found during the search.

5. The method of claim 4, wherein the output includes a graphical representation of the distribution.

6. The method of claim 1, further comprising:
receiving a request for another search query based on the differences between the plurality of first facts and the plurality of second facts.

7. The method of claim 1, wherein an additional search query is provided based on the differences between the plurality of first facts and the plurality of second facts.

8. A non-transitory machine-readable medium having instructions embodied thereon, the instructions executable by a processor of a machine to perform operations comprising:
receiving a prompt with a request associated with an item;
parsing, by a large language model (LLM), the prompt to extract a plurality of first facts for the item in a predefined format;
generating, by the LLM, descriptive text based on the prompt;
parsing, by the LLM, the descriptive text to extract a plurality of second facts for the item in the predefined format;
generating a search query that includes the plurality of first facts and the second facts;
performing a search using the search query;
generating an output based on results from the search query, the output including:
a suggested description of the item, the suggested description including at least one fact of the plurality of first facts and one fact of the plurality of second facts;
a summarization of the plurality of first facts and the second facts;
differences between the plurality of first facts and the second facts;
an accuracy of the generated descriptive text output by the LLM; and
a distribution of the plurality of first facts and the second facts in the results; and
presenting the output on a user interface.

9. The non-transitory machine-readable medium of claim 8, wherein the predefined format is a key value pair and the output includes the plurality of first facts and the plurality of second facts in the key value pair format.

10. The non-transitory machine-readable medium of claim 8, wherein the output provides a listing of sources of the plurality of second facts.

11. The non-transitory machine-readable medium of claim 8, the operations further comprising:
presenting a distribution of a number of times the second facts are in sources found during the search.

12. The non-transitory machine-readable medium of claim 11, wherein the output includes a graphical representation of the distribution.

13. The non-transitory machine-readable medium of claim 8, the operations further comprising:
receiving a request for another search query based on the differences between the plurality of first facts and the plurality of second facts.

14. The non-transitory machine-readable medium of claim 8, wherein the search query is provided when there is a discrepancy between the plurality of first facts and the plurality of second facts.

15. A device, comprising:
a processor; and
memory including instructions that, when executed by the processor, cause the device to perform operations including:
receiving a prompt with a request associated with an item;
parsing, by a large language model (LLM), the prompt to extract a plurality of first facts for the item in a predefined format;
generating, by the LLM, descriptive text based on the prompt;
parsing, by the LLM, the descriptive text to extract a plurality of second facts for the item in the predefined format;
generating a search query that includes the plurality of first facts and the second facts;
performing a search using the search query;
generating an output based on results from the search query, the output including:
a suggested description of the item, the suggested description including at least one fact of the plurality of first facts and one fact of the plurality of second facts;
a summarization of the plurality of first facts and the second facts;
differences between the plurality of first facts and the second facts;
an accuracy of the generated descriptive text output by the LLM; and
a distribution of the plurality of first facts and the second facts in the results; and
presenting the output on a user interface.

16. The device of claim 15, wherein the predefined format is a key value pair and the output includes the plurality of first facts and the plurality of second facts in the key value pair format.

17. The device of claim 15, wherein the output provides a listing of sources of the plurality of second facts.

18. The device of claim 15, the operations further comprising:
presenting a distribution of a number of times the second facts are in sources found during the search.

19. The device of claim 15, the operations further comprising:
receiving a request for another search query based on the differences between the plurality of first facts and the plurality of second facts.

20. The device of claim 15, wherein the search query is provided when there is a discrepancy between the plurality of first facts and the plurality of second facts.

* * * * *